(12) United States Patent
Mei et al.

(10) Patent No.: US 11,619,234 B2
(45) Date of Patent: Apr. 4, 2023

(54) RAPID-RESPONSE COMPRESSED AIR ENERGY STORAGE SYSTEM AND USING METHOD THEREOF

(71) Applicant: Tsinghua University, Beijing (CN)

(72) Inventors: Shengwei Mei, Beijing (CN); Xiaodai Xue, Beijing (CN); Xuelin Zhang, Beijing (CN); Tong Zhang, Beijing (CN); Laijun Chen, Beijing (CN); Qiang Lu, Beijing (CN); Tianwen Zheng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 832 days.

(21) Appl. No.: 16/522,607

(22) Filed: Jul. 25, 2019

(65) Prior Publication Data
US 2020/0032802 A1     Jan. 30, 2020

(30) Foreign Application Priority Data

Jul. 25, 2018   (CN) .......................... 2018108285286

(51) Int. Cl.
*F04C 29/04*   (2006.01)
*F01M 1/16*   (2006.01)
(Continued)

(52) U.S. Cl.
CPC .............. *F04C 29/04* (2013.01); *F01M 1/16* (2013.01); *F02C 6/16* (2013.01); *F04C 29/02* (2013.01);
(Continued)

(58) Field of Classification Search
CPC .... F01M 1/16; F01M 5/00; F02C 6/16; F02C 7/143; F04C 29/02; H02J 15/006; Y02E 60/16; F05D 2260/213; F05D 2260/211
See application file for complete search history.

(56) References Cited

U.S. PATENT DOCUMENTS

| 4,227,862 A * | 10/1980 | Andrew ................ F25B 49/022 417/18 |
| 2011/0000227 A1* | 1/2011 | Kamiya .................. F04C 29/04 62/505 |
| 2018/0320927 A1* | 11/2018 | Yamamoto ............ F24H 9/2007 |

FOREIGN PATENT DOCUMENTS

| CN | 103216426 A | 7/2013 |
| CN | 108139125 A | 6/2018 |

(Continued)

OTHER PUBLICATIONS

The First Chinese Office Action for Application No. 201810828528.6 dated Apr. 26, 2019, 7 pages, (English translation).
(Continued)

*Primary Examiner* — Kenneth J Hansen
*Assistant Examiner* — Wesley G Harris
(74) *Attorney, Agent, or Firm* — Womble Bond Dickinson (US) LLP

(57) ABSTRACT

The present disclosure relates to the field of energy storage, and provides a rapid-response energy storage system and a using method thereof. The system comprises an air storage chamber, a compressor unit, an expander unit, a compressor unit lubrication station, an expander unit lubrication station, a compressor unit oil cooler, an expander unit oil cooler, a compressor unit oil pump and an expander unit oil pump; an outlet of the compressor unit communicates with an inlet of the air storage chamber through a heating pipe inside the expander unit lubrication station, and an outlet of the air storage chamber communicates with a heating pipe inside the compressor unit lubrication station sequentially through a regulating valve and the expander unit; the compressor unit lubrication station, the compressor unit oil pump, an oil way inside the compressor unit and the high-temperature side of the compressor unit oil cooler are sequentially connected end to end to form a first oil circulation loop; and (Continued)

the expander unit lubrication station, the expander unit oil pump, an oil way inside the expander unit and the high-temperature side of the expander unit oil cooler are sequentially connected end to end to form a second oil circulation loop. According to the present disclosure, rapid responses can be achieved and the lubricating oil can be heated without the consumption of external thermal energy.

9 Claims, 4 Drawing Sheets

(51) Int. Cl.
    *F02C 6/16*     (2006.01)
    *H02J 15/00*     (2006.01)
    *F04C 29/02*     (2006.01)

(52) U.S. Cl.
    CPC ...... *H02J 15/006* (2013.01); *F05D 2260/211* (2013.01)

(56) References Cited

FOREIGN PATENT DOCUMENTS

| JP | 2017008887 A | 1/2017 | |
|---|---|---|---|
| WO | WO-2016181883 A1 * | 11/2016 | ............. F01D 25/14 |
| WO | WO-2017044658 A1 * | 3/2017 | ............. F01K 13/02 |
| WO | WO-2017073433 A1 * | 5/2017 | ................ F02C 1/04 |

OTHER PUBLICATIONS

The Chinese Search Report for Application No. 2018108285286 dated Apr. 15, 2019, 2 pages.

* cited by examiner

RAPID-RESPONSE COMPRESSED AIR ENERGY STORAGE SYSTEM AND USING METHOD THEREOF

FIELD OF TECHNOLOGY

The present disclosure relates to the field of energy storage technologies, and specifically, to a rapid-response energy storage system and a using method thereof.

BACKGROUND

The power industry, as a social basic industry, is one of the lifeline industries of national development. With the rapid development of the domestic economy, the demand for electricity is also growing, and thus the difference between peak and valley loads of power grids is gradually widening. An energy storage technology is a critical technology to solve such problems as small capacity and high load fluctuation of distributed energy systems, and is of great significance for the development and improvement of the energy storage structure of the power grids.

A compressed air energy storage system is a widely used energy storage technology. The main principle of the compressed air energy storage system is to store the surplus power at a valley load period of the power system as energy and release it at a peak load period thereof so as to drive an expander to generate electricity. The compressed air energy storage system has such advantages of large capacity, low cost, high safety and reliable operation and is particularly suitable for providing peaking service and capacity backup for the power grid.

The main energy conversion equipment of the compressed air energy storage system comprises a compressor and an expander. The compressor and the expander are provided with pressure-loaded bearings, a high speed gear box and the like. Since these parts require oil lubrication and oil cooling during operation, and thus it must be ensured that an oil system is ready before the compressed air energy storage system operates. Normally, the oil system is allowed to start when the oil temperature of the lubrication station reaches 30 degrees Celsius or higher. However, due to the influence of the ambient temperature, the oil temperature of the lubrication station before starting is usually lower than the allowable starting temperature during most of the year and especially in winter, the lubrication station has a warm-up time of up to half an hour or even longer. However, when the peak-load regulation, especially deep peak-load regulation of the power grid is performed, the response time of a peak-load regulation unit is generally required to be on the order of several minutes. If the response speed of the system is slow, it is impossible to provide high-quality capacity support for the power grid and its technical competitiveness and economy will be greatly compromised. It is obvious that the existing compressed air energy storage system should be optimized to meet the response speed of the grid dispatching better.

SUMMARY

The present disclosure is intended to solve the technical problem that the compressed air energy storage system in the prior art has a slow response speed.

In order to solve the above problems, the present disclosure provides a rapid-response energy storage system comprising an air storage chamber, a compressor unit, an expander unit, a compressor unit lubrication station, an expander unit lubrication station, a compressor unit oil cooler, an expander unit oil cooler, a compressor unit oil pump, an expander unit oil pump, and an electric motor and a generator respectively connected to the compressor unit and the expander unit, wherein a heating pipe and a temperature sensor are disposed inside each of the compressor unit lubrication station and the expander unit lubrication station;

an outlet of the compressor unit communicates with an inlet of the air storage chamber through the heating pipe inside the expander unit lubrication station, and an outlet of the air storage chamber communicates with the heating pipe inside the compressor unit lubrication station sequentially through a regulating valve and the expander unit;

the compressor unit lubrication station, the compressor unit oil pump, an oil way inside the compressor unit and a high-temperature side of the compressor unit oil cooler are sequentially connected end to end to form a first oil circulation loop; and the expander unit lubrication station, the expander unit oil pump, an oil way inside the expander unit and a high-temperature side of the expander unit oil cooler are sequentially connected end to end to form a second oil circulation loop.

In an embodiment of the present disclosure, the outlet of the compressor unit communicates with an inlet of the air storage chamber and an inlet of the heating pipe inside the expander unit lubrication station, respectively.

In an embodiment of the present disclosure, a first valve is disposed at the inlet of the heating pipe inside the expander unit lubrication station.

In an embodiment of the present disclosure, the rapid-response energy storage system further comprises an air regenerator, wherein the regulating valve communicates with an inlet of the expander unit through the low-temperature side of the air regenerator, and an outlet of the expander unit communicates with an inlet at the high-temperature side of the air regenerator and an inlet at the inlet of the heating pipe in the compressor unit lubrication station, respectively.

In an embodiment of the present disclosure, a second valve is disposed at the inlet of the heating pipe inside the compressor unit lubrication station.

In an embodiment of the present disclosure, an inlet at the low-temperature side of the compressor oil cooler communicates with the outside atmosphere, and an outlet thereof communicates with an inlet of the compressor unit.

In an embodiment of the present disclosure, the regulating valve communicates with the inlet of the expander unit through the low-temperature side of the expander unit oil cooler.

In an embodiment of the present disclosure, a one-way valve is disposed at the inlet of the air storage chamber.

In an embodiment of the present disclosure, the rapid-response energy storage system further comprises a first heat exchanger, a second heat exchanger, a heat reservoir, a cold reservoir, a third valve and a fourth valve; the cold reservoir, the third valve, the low-temperature side of the first heat exchanger, the heat reservoir, the fourth valve and the high-temperature side of the second heat exchanger are connected end to end to form a regenerative circulation loop; the outlet of the compressor unit communicates with the heating pipe inside the expander unit lubrication station through the high-temperature side of the first heat exchanger, and the regulating valve communicates with the inlet of the expander unit through the low-temperature side of the second heat exchanger.

In order to solve the above problems, the present disclosure also provides a using method of a rapid-response energy storage system, the method comprises the following steps at the energy storage stage:

S1.1, acquiring the oil temperature of the compressor unit lubrication station, and proceeding to the step S1.2;

S1.2, judging whether the oil temperature of the compressor unit lubrication station is not less than a first temperature threshold, if the oil temperature of the compressor unit lubrication station is not less than the first temperature threshold, then proceeding to the step S1.3, and if the oil temperature of the compressor unit lubrication station is less than the first temperature threshold, then proceeding to the step S1.1;

S1.3, starting the electric motor and the compressor unit oil pump, and proceeding to the step S1.4;

S1.4, acquiring the oil temperature of the expander unit lubrication station, and proceeding to the step S1.5;

S1.5, judging whether the oil temperature of the expander unit lubrication station is greater than a second temperature threshold or not, if the oil temperature of the expander unit lubrication station is greater than the second temperature threshold, then proceeding to the step S1.6, and if the oil temperature of the expander unit lubrication station is not greater than the second temperature threshold, then proceeding to the step S1.4; wherein the first temperature threshold is less than the second temperature threshold;

S1.6, closing the first valve;

the method comprises the following steps at the energy release stage:

S2.1, acquiring the oil temperature of the expander unit lubrication station, and proceeding to the step S2.2;

S2.2, judging whether the oil temperature of the expander unit lubrication station not less than a third temperature threshold, if the oil temperature of the expander unit lubrication station is not less than the third temperature threshold, then proceeding to the step S1.3, and if the oil temperature of the expander unit lubrication station is less than the third temperature threshold, then proceeding to the step S2.1;

S2.3, opening the regulating valve and starting the expander unit oil pump, and proceeding to the step S2.4;

S2.4, acquiring the oil temperature of the compressor unit lubrication station, and proceeding to the step S2.5;

S2.5, judging whether the oil temperature of the compressor unit lubrication station is greater than a fourth temperature threshold or not, if the oil temperature of the compressor unit lubrication station is greater than the fourth temperature threshold, then proceeding to the step S2.6, and if the oil temperature of the compressor unit lubrication station is not greater than the fourth temperature threshold, then proceeding to the step S2.4; wherein the third temperature threshold is less than the fourth temperature threshold;

S2.6, closing the second valve.

The present disclosure has the advantages of simple structure and convenient operation. At the energy storage stage, by preheating the lubricating oil in the expander unit lubrication station using the exhaust air of the compressor unit, it can be ensured that the oil temperature of the expander unit lubrication station can rapidly satisfy the starting condition of the expander unit at the energy release stage. Simultaneously, at the energy release stage, by preheating the lubricating oil in the compressor unit lubrication station using the exhaust air of the expander unit, it can be ensured that the oil temperature of the compressor unit lubrication station can rapidly satisfy the starting condition of the compressor unit at the energy storage stage. According to the rapid-response energy storage system, rapid responses at both the energy storage and energy release stages can be achieved, and the expander unit lubrication station and the compressor unit lubrication station can be heated without the consumption of external thermal energy.

| [Description of the reference numbers] | |
|---|---|
| 1-1 electric motor | 1-2 compressor unit |
| 1-3 compressor unit oil cooler | 1-4 compressor unit lubrication |
| 1-5 compressor unit oil pump | 2 air storage chamber |
| 3 regulating valve | 4-1 generator |
| 4-2 expander unit | 4-3 expander unit oil cooler |
| 4-4 expander unit lubrication station | 4-5 expander unit oil pump |
| 5 first valve | 6 air regenerator |
| 7 second valve | 8 cold reservoir |
| 9 third valve | 10 first heat exchanger |
| 11 heat reservoir | 12 fourth valve |
| 13 second heat exchanger | |

DESCRIPTION OF THE EMBODIMENTS

In order to make the objects, the technical solutions and the advantages of the present disclosure more clear, the technical solutions of the present disclosure will be clearly described below in conjunction with the drawings. It is obvious that the described embodiments are a part of and not all of the embodiments of the present disclosure. All other embodiments obtained by a person skill in the art based on the embodiments of the present disclosure fall within the protective scope of the present disclosure.

It should be noted that, the term "connected" shall be understood broadly, for example, it may be fixedly connected, detachably connected, or an integrally connected; it may be directly connected or indirectly connected through an intervening element, unless otherwise specifically indicated and defined. The specific meaning of the terms above in the present disclosure can be understood in the specific circumstances by those skilled in the art.

Embodiment 1

Figure 1:
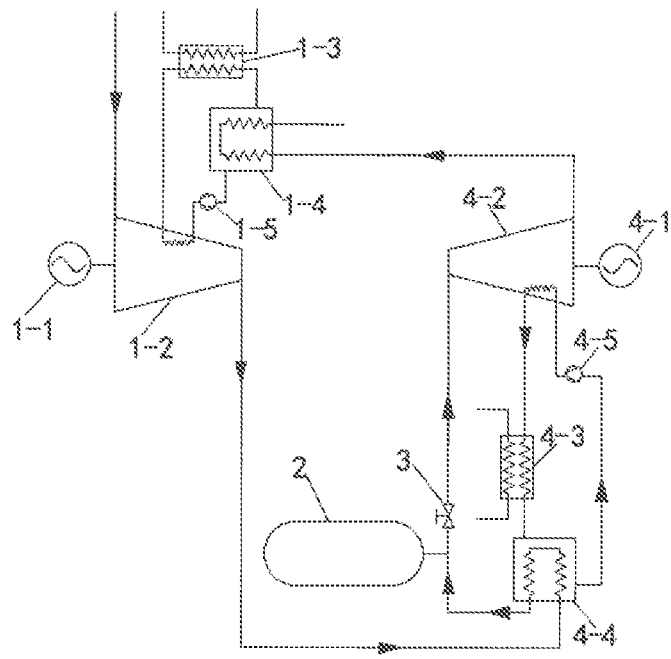
FIG. 1 is a schematic structural view of a rapid-response energy storage system according to a first embodiment of the present disclosure.

As shown in FIG. 1, the present disclosure provides a rapid-response energy storage system comprising an air storage chamber 2, a compressor unit 1-2, an expander unit 4-2, a compressor unit lubrication station 1-4, an expander unit lubrication station 4-4, a compressor unit oil cooler 1-3, an expander unit oil cooler 4-3, a compressor unit oil pump 1-5, an expander unit oil pump 4-5, and an electric motor 1-1 and a generator 4-1 respectively connected to the compressor unit 1-2 and the expander unit 4-2, wherein a heating pipe and a temperature sensor are disposed inside each of the compressor unit lubrication station 1-4 and the expander unit lubrication station 4-4, the lubrication station comprising a oil tank;

an outlet of the compressor unit 1-2 communicates with an inlet of the air storage chamber 2 through the heating pipe inside the expander unit lubrication station 4-4, and an outlet of the air storage chamber 2 communicates with the heating pipe inside the compressor unit lubrication station 1-4 sequentially through a regulating valve 3 and the expander unit 4-2;

the compressor unit lubrication station 1-4, the compressor unit oil pump 1-5, an oil way inside the compressor unit 1-2 and a high-temperature side of the compressor unit oil cooler 1-3 are sequentially connected end to end to form a first oil circulation loop; and the expander unit lubrication station 4-4, the expander unit oil pump 4-5, an oil way inside the expander unit 4-2 and a high-temperature side of the expander unit oil cooler 4-3 are sequentially connected end to end to form a second oil circulation loop.

Therefore, at the energy storage stage, the oil temperature of the compressor unit lubrication station 1-4 is firstly detected, and the electric motor 1-1 and the compressor unit oil pump 1-5 are started when the oil temperature of the compressor unit lubrication station 1-4 satisfies the starting condition of the compressor unit 1-2, that is, when the oil temperature of the compressor unit lubrication station 1-4 is not less than the minimum temperature threshold. At this time, the compressor unit oil pump 1-5 will continuously pump the lubricating oil in the compressor unit lubrication station 1-4 to the oil way inside the compressor unit 1-2 so as to cool and lubricate various parts in the compressor unit 1-2. The warmed lubricating oil flows out from the compressor unit 1-2 and then flows into the high-temperature side of the compressor unit oil cooler 1-3 for cooling. The lubricating oil is cooled via the compressor unit oil cooler 1-3, and then flows back to the compressor unit lubrication station 1-4 again. At the same time, under the driving of the electric motor 1-1, the compressor unit 1-2 will continuously compress the air flowing from its inlet into high-temperature and high-pressure compressed air, and the compressed air is discharged from the compressor unit 1-2 and then flows into the air storage chamber 2 through the heating pipe inside the expander unit lubrication station 4-4. Since the oil temperature of the expander unit lubrication station 4-4 is much lower than the temperature of the compressed air, the compressed air continuously transfers heat to the lubricating oil in the expander unit lubrication station 4-4 through heat conduction, convection, and the like when the compressed air flows through the expander unit lubrication station 4-4 such that the oil temperature of the expander unit lubrication station 4-4 can rapidly satisfy the starting condition of the expander unit 4-2 when the energy is released.

At the energy release stage, the oil temperature of the expander unit lubrication station 4-4 is firstly detected. Since the exhaust air of the compressor unit 1-2 preheats the lubricating oil in the expander unit lubrication station 4-4 at the energy storage stage, the oil temperature of the expander unit lubrication station 4-4 can easily satisfy the starting condition of the expander unit 4-2, that is, the oil temperature of the expander unit lubrication station 4-4 can be rapidly above the minimum temperature threshold, so that the system can rapidly start the expander unit oil pump 4-5 to enter the release energy stage when the power generation command is received and the regulating valve 3 is opened. Therefore, the expander unit oil pump 4-5 will continuously pumps the lubricating oil in the expander unit lubrication station 4-4 to the oil way inside the expander unit 4-2 so as to cool and lubricate the various parts in the expander unit 4-2. The warmed lubricating oil flows out from the expander unit 4-2 and then flows into the high-temperature side of the expander unit oil cooler 4-3 for cooling. The lubricating oil is cooled via the expander unit oil cooler 4-3, and then flows back to the expander unit lubrication station. 4-4. At the same time, after the regulating valve 3 is opened, the compressed air stored in the air storage chamber 2 continuously flows into the expander unit 4-2 for doing work, while the expanded and heated exhaust air in the expander unit 4-2 is directly discharged into the heating pipe inside the compressor unit lubrication station 1-4. Since the oil temperature of the compressor unit lubrication station 1-4 is much lower than the exhaust air temperature of the expander unit 4-2, the exhaust air of the expander unit 4-2 continuously transfers heat to the lubricating oil in the compressor unit lubrication station 1-4 through heat conduction, convection, and the like when the exhaust air of the expander unit 4-2 flows through the compressor unit lubrication station 1-4 such that the oil temperature of the compressor unit lubrication station 1-4 can rapidly satisfy the starting condition of the compressor unit 1-2 when the energy is stored.

As can be seen from the above, the present disclosure has the advantages of simple structure and convenient operation. At the energy storage stage, by preheating the lubricating oil in the expander unit lubrication station 4-4 using the exhaust air of the compressor unit 1-2, it can be ensured that the oil temperature of the expander unit lubrication station 4-4 can rapidly satisfy the starting condition of the expander unit 4-2 at the energy release stage. Simultaneously, at the energy release stage, by preheating the lubricating oil in the compressor unit lubrication station 1-4 using the exhaust air of the expander unit 4-2, it can be ensured that the oil temperature of the compressor unit lubrication station 1-4 can rapidly satisfy the starting condition of the compressor unit 1-2 at the energy storage stage. According to the rapid-response energy storage system, rapid responses at both the energy storage and energy release stages can be achieved and the expander unit lubrication station 4-4 and the compressor unit lubrication station 1-4 can be heated without the consumption of external thermal energy.

Figure 2:
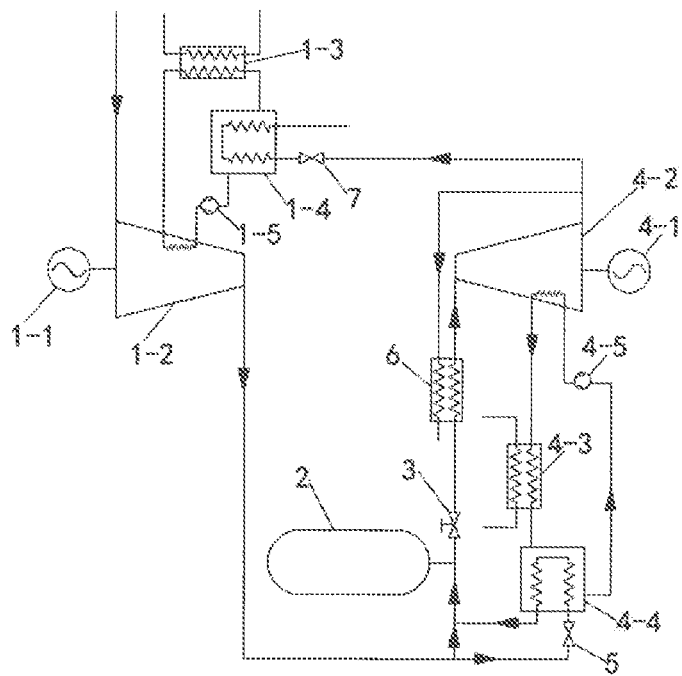
FIG. 2 is a schematic structural view of another rapid-response energy storage system according to the first embodiment of the present disclosure.

Preferably, as shown in FIG. 2, the outlet of the compressor unit 1-2 respectively communicates with the inlet of the air storage chamber 2 and an inlet of the heating pipe inside the expander unit lubrication station 4-4, that is, the compressed air is divided into two paths after being discharged from the compressor unit 1-2: one path directly flows into the air storage chamber 2, and the other path passes through the heating pipe inside the expander unit lubrication station 4-4 and then flows into the air storage chamber 2.

Further, in order to avoid excessive high oil temperature of the expander unit lubrication station 4-4 at the energy storage stage, a first valve 5 is disposed at the inlet of the heating pipe inside the expander unit lubrication station 4-4. Therefore, after the electric motor 1-1 and the compressor unit oil pump 1-5 are started, the first valve 5 can be closed when the oil temperature of the expander unit lubrication station 4-4 is greater than the maximum temperature threshold, such that the exhaust air of the compressor unit 1-2 all directly flows into the air storage chamber 2 without entering the expander unit lubrication station 4-4.

Further, the rapid-response energy storage system also comprises an air regenerator 6, wherein the regulating valve 3 communicates with an inlet of the expander unit 4-2 through the low-temperature side of the air regenerator 6, and an outlet of the expander unit 4-2 communicates with an inlet at the high-temperature side of the air regenerator 6 and an inlet of the heating pipe in the compressor unit lubrication station 1-4, respectively, that is, the exhaust air is divided into two paths after being discharged from the expander unit 4-2: one path flows into the high-temperature side of the air regenerator 6 for heating intake air of the expander unit 4-2, and the other path flows into the heating pipe inside the compressor unit lubrication station 1-4. It should be noted that the system may not be provided an air regenerator 6, and the remaining of the exhaust air discharged from the expander unit 4-2, except for the portion of the exhaust air used to heat the compressor unit lubrication station 1-4, may be directly discharged into the environment.

Further, in order to avoid excessive high oil temperature of the compressor unit lubrication station 1-4 at the energy release stage, a second valve 7 is disposed at the inlet of the heating pipe inside the compressor unit lubrication station 1-4. Therefore, after the regulating valve 3 is opened and the expander unit oil pump 4-5 is started, the second valve 7 can be closed when the oil temperature of the compressor unit lubrication station 1-4 is greater than the maximum temperature threshold, such that the exhaust air of the expander unit 4-2 all directly flows into the air regenerator 6 without entering the compressor unit lubrication station 1-4.

Figure 3:
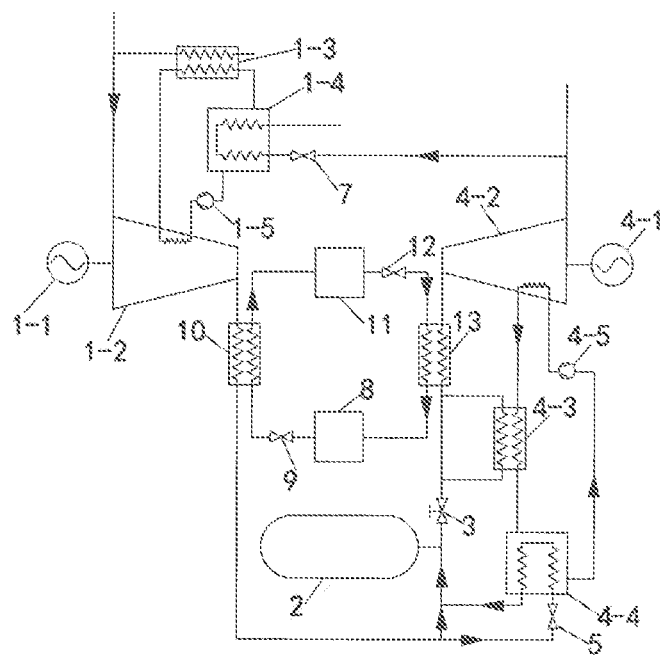
FIG. 3 is a schematic structural view of still another rapid-response energy storage system according to the first embodiment of the present disclosure.

Preferably, as shown in FIG. 3, considering that the own temperature of air flowing through the low-temperature side of the compressor unit oil cooler 1-3 is remarkably increased after cooling the lubricating oil flowing through the high-temperature side of the compressor unit oil cooler 1-3, the intake air of the compressor unit 1-2 can be preheated using the compressor unit oil cooler 1-3. Specifically, an inlet at the low-temperature side of the compressor unit oil cooler 1-3 communicates with the outside atmosphere, and an outlet thereof communicates with the inlet of the compressor unit 1-2. It should be noted that, the inlet of the compressor unit 1-2 can directly communicate with the outside atmosphere in addition to communicating with the compressor unit oil cooler 1-3, that is, the intake air of the compressor unit 1-2 can be divided into two paths: one path directly comes from outside atmosphere, and the other path passes through the compressor unit oil cooler 1-3.

Preferably, the regulating valve 3 communicates with the inlet of the expander unit 4-2 through the low-temperature side of the expander unit oil cooler 4-3, that is, an inlet at the low-temperature side of the expander unit oil cooler 4-3 communicates with the regulating valve 3, and an outlet at the low-temperature side of the expander unit oil cooler 4-3 communicates with the inlet of the expander unit 4-2. Therefore, at the energy release stage, the compressed air flowing out of the air storage chamber 2 firstly flows into the low-temperature side of the expander unit oil cooler 4-3, and the compressed air flow into the expander unit 4-2 after exchanging heat with the lubricating oil flowing through the high-temperature side of the expander unit oil cooler 4-3 and being warmed. Therefore, by connecting the inlet and outlet of the expander unit oil cooler 4-3 to the regulating valve 3 and the expander unit 4-2, respectively, the expander unit oil cooler 4-3 can be used to preheat the intake air of the expander unit 4-2. It should be noted that, the outlet of the regulating valve 3 can directly communicate with the expander unit 4-2 at the same time in addition to communicating with the expander unit oil cooler 4-3, that is, the exhaust air of the air storage chamber 2 is divided into two paths: one path directly enters the expander unit 4-2, and the other path enters the expander unit 4-2 after being heated by the expander unit oil cooler 4-3.

Preferably, in order to prevent backflow of compressed air in the air storage chamber 2 back to the expander unit lubrication station 4-4, a one-way valve is disposed at the inlet of the air storage chamber 2.

In addition, the rapid-response energy storage system further comprises a first heat exchanger 10, a second heat exchanger 13, a heat reservoir 11, a cold reservoir 8, a third valve 9 and a fourth valve 12; wherein the cold reservoir 8, the third valve 9, the low-temperature side of the first heat exchanger 1, the heat reservoir 11, the fourth valve 12 and the high-temperature side of the second heat exchanger 13 are connected end to end to form a regenerative circulation loop; the outlet of the compressor unit 1-2 communicates with a heating pipe inside the expander unit lubrication station 4-4 through the high-temperature side of the first heat exchanger 10, and the regulating valve 3 communicates with the inlet of the expander unit 4-2 through the low-temperature side of the second heat exchanger 13.

At the energy storage stage, the third valve 9 is opened, and the fourth valve 12 is closed, and thus a regenerative working medium continuously absorbs the heat of the compressed air flowing through the first heat exchanger 10 when the regenerative working medium flows from the cold reservoir 8 into the low-temperature side of the first heat exchanger 10, the warmed regenerative working medium flows out of the first heat exchanger 10 and then is directly stored in the heat reservoir 11 for use in the energy release stage. At the energy release stage, the fourth valve 12 is opened, and the third valve 9 is closed. The regenerative working medium will continuously release its own heat to the compressed air flowing through the second heat exchanger 13 when the high-temperature regenerative working medium flows from the heat reservoir 11 to the high-temperature side of the second heat exchanger 13, and the cooled regenerative working medium flows out of the second heat exchanger 13 and then is stored in the cold reservoir 8 for use in the energy storage stage.

Embodiment 2

The present disclosure also provides a using method of a rapid-response energy storage system.

Figure 4:
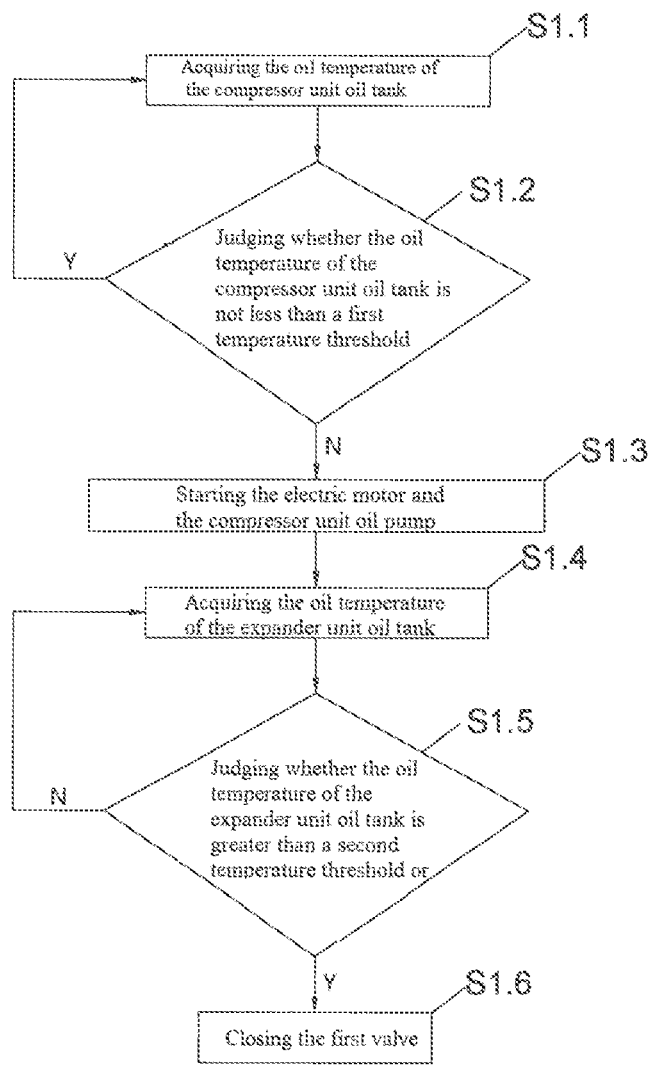
FIG. 4 is a flow chart showing a method of using the rapid-response energy storage system at the energy storage stage according to a second embodiment of the present disclosure.

As shown in FIG. 4, the method comprises the following steps at the energy storage stage:

S1.1, acquiring the oil temperature of the compressor unit lubrication station 1-4, and proceeding to the step S1.2;

S1.2, judging whether the oil temperature of the compressor unit lubrication station 1-4 is not less than a first temperature threshold, wherein when the oil temperature of the compressor unit lubrication station 1-4 is not less than the first temperature threshold, it is illustrated that the oil temperature of the compressor unit lubrication station 1-4 satisfies the starting condition of the compressor unit 1-2, and the starting being performed at this time, that is, proceeding to the step S1.3; and when the oil temperature of the compressor unit lubrication station 1-4 is less than the first temperature threshold, continuously detecting the oil temperature of the compressor unit 1-2, that is, proceeding to the step S1.1;

S1.3, starting the electric motor 1-1 and the compressor unit oil pump 1-5, at that time, the compressor unit 1-2 will continuously compress the air flowing from its inlet into high-temperature and high-pressure compressed air, and the compressed air is discharged from the compressor unit 1-2 under the driving of the electric motor 1-1, and then flows into the air storage chamber 2 through the heating pipe inside the expander unit lubrication station 4-4. Since the oil temperature of the expander unit lubrication station 4-4 is much lower than the temperature of the compressed air, the compressed air continuously transfers heat to the lubricating oil in the expander unit lubrication station 4-4 through heat conduction, convection, and the like when the compressed air flows through the expander unit lubrication station 4-4. In order to avoid the excessive high oil temperature of the expander unit lubrication station 4-4, it is necessary to detect the oil temperature of the expander unit lubrication station 4-4 in real time after the electric motor 1-1 and the compressor unit oil pump 1-5 are started, that is, proceeding to the step S1.4;

S1.4, acquiring the oil temperature of the expander unit lubrication station 4-4, and proceeding to the step S1.5;

S1.5, judging whether the oil temperature of the expander unit lubrication station 4-4 is greater than a second temperature threshold or not, if the oil temperature of the expander unit lubrication station 4-4 is greater than the second temperature threshold, then proceeding to the step S1.6, and if the oil temperature of the expander unit lubrication station 4-4 is not greater than the second temperature threshold, then proceeding to the step S1.4; wherein the first temperature threshold is less than the second temperature threshold; and S1.6, closing the first valve 5; thus, when the oil temperature of the expander unit lubrication station 4-4 is greater than the second temperature threshold, the first valve 5 can be closed such that the exhaust air of the compressor unit 1-2 all directly flows into the air storage chamber 2 without entering the expander unit lubrication station 4-4.

Figure 5:
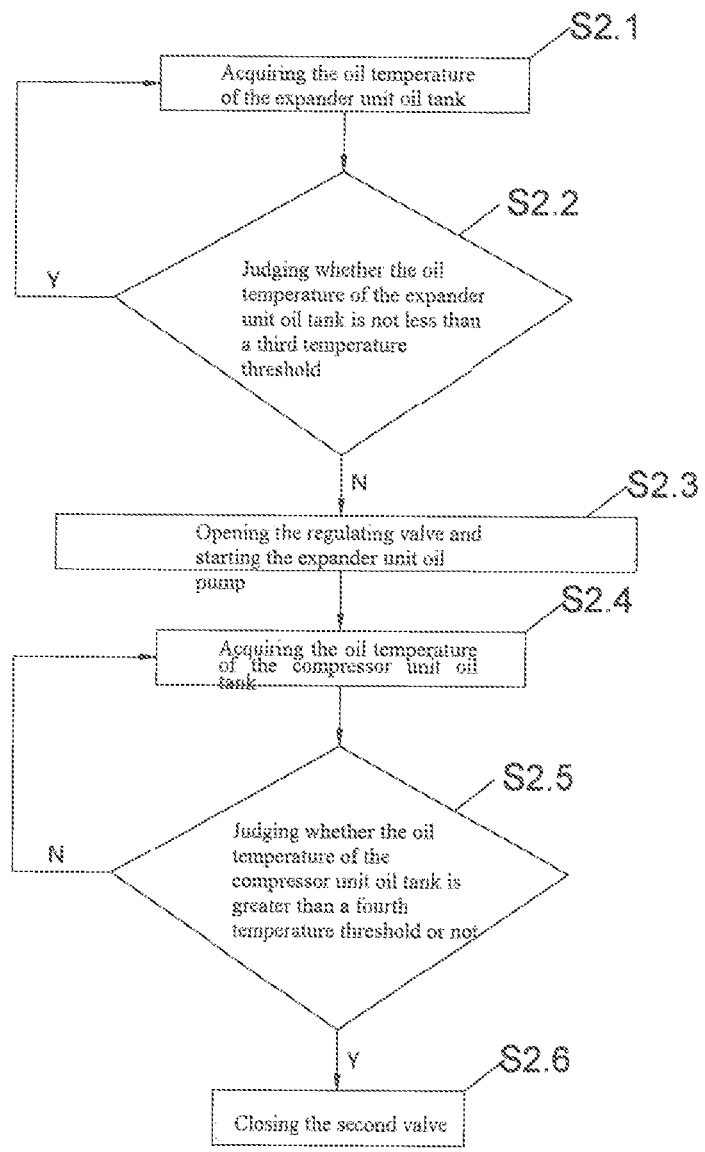
FIG. 5 is a flow chart showing a method of using the rapid-response energy storage system at the energy release stage according to the second embodiment of the present disclosure.

As shown in FIG. 5, the method comprises the following steps at the energy release stage:

S2.1, acquiring the oil temperature of the expander unit lubrication station 4-4, and proceeding to the step S2.2;

S2.2, judging whether the oil temperature of the expander unit lubrication station 4-4 is not less than a third temperature threshold or not, wherein when the oil temperature of the expander unit lubrication station 4-4 is not less than the third temperature threshold, it is illustrated that the oil temperature of the expander unit lubrication station 4-4 satisfies the starting condition and the starting being performed at this time, that is, proceeding to the step S1.3, and when the oil temperature of the expander unit lubrication station is less than the third temperature threshold, continuously detecting the oil temperature of the expander unit lubrication station 4-4, that is, proceeding to the step S2.1;

S2.3, opening the regulating valve 3 and starting the expander unit oil pump 4-5; at this time, the compressed air stored in the air storage chamber 2 continuously flows into the expander unit 4-2 for doing work, while the expanded and heated exhaust air in the expander unit 4-2 is directly discharged into the heating pipe inside the compressor unit lubrication station 1-4. Since the oil temperature of the compressor unit lubrication station 1-4 is much lower than the exhaust air temperature of the expander unit 4-2, the exhaust air of the expander unit 4-2 continuously transfers heat to the lubricating oil in the compressor unit lubrication station 1-4 through heat conduction, convection, and the like when the exhaust air of the expander unit 4-2 flows through the compressor unit lubrication station 1-4. In order to avoid the excessive high oil temperature of the compressor unit lubrication station 1-4, it is necessary to detect the oil temperature of the compressor unit lubrication station 1-4 in real time after the regulating valve 3 is opened and the expander unit oil pump is started, that is, proceeding to the step S2.4;

S2.4, acquiring the oil temperature of the compressor unit lubrication station 1-4, and proceeding to the step S2.5;

S2.5, judging whether the oil temperature of the compressor unit lubrication station 1-4 is greater than a fourth temperature threshold or not, if the oil temperature of the compressor unit lubrication station 1-4 is greater than the fourth temperature threshold, then proceeding to the step S2.6, and if the oil temperature of the compressor unit lubrication station is not greater than the fourth temperature threshold, then proceeding to the step S2.4; wherein the third temperature threshold is less than the fourth temperature threshold; and S2.6, closing the second valve 7, thus, when the oil temperature of the compressor unit lubrication station 1-4 is greater than the maximum temperature threshold, the second valve 7 can be closed, so that the exhaust air of the expander unit 4-2 flows completely into the high-temperature side of the air regenerator 6 without entering the compressor unit lubrication station 1-4.

It should be noted that, the first temperature threshold and the third temperature threshold may be the same value, for example, 30 degrees Celsius; the second temperature threshold and the fourth temperature threshold may also be the same value.

Finally, it should be noted that the embodiments above are merely illustrative of the technical solutions of the present disclosure, and are not intended to be limiting; although the present disclosure has been described in detail with reference to the foregoing embodiments, a person skilled in the art will understand that modifications may be made to the technical solutions described in the various foregoing embodiments, or equivalent replacements may be made to some of the technical features thereof. These modifications or replacements do not cause the nature of the corresponding technical solution to deviate from the spirit and scope of the technical solutions of the various embodiments according to the present disclosure.

What is claimed is:

1. A rapid-response energy storage system, comprising: an air storage chamber, a compressor unit, an expander unit, a compressor unit lubrication station, an expander unit lubrication station, a compressor unit oil cooler, an expander unit oil cooler, a compressor unit oil pump, an expander unit oil pump, and an electric motor and a generator respectively connected to the compressor unit and the expander unit;

an outlet of the compressor unit communicates with an inlet of the air storage chamber through a heating pipe in the expander unit lubrication station, and an outlet of the air storage chamber communicates with a heating pipe in the compressor unit lubrication station sequentially through a regulating valve and the expander unit;

the compressor unit lubrication station, the compressor unit oil pump, an oil way inside the compressor unit and a high-temperature side of the compressor unit oil cooler are sequentially connected end to end to form a first oil circulation loop; and the expander unit lubrication station, the expander unit oil pump, an oil way in the expander unit and a high-temperature side of the expander unit oil cooler are sequentially connected end to end to form a second oil circulation loop.

2. The rapid-response energy storage system of claim 1, wherein the outlet of the compressor unit respectively communicates with the inlet of the air storage chamber and an inlet of the heating pipe in the expander unit lubrication station.

3. The rapid-response energy storage system of claim 2, wherein a first valve is disposed at the inlet of the heating pipe in the expander unit lubrication station.

4. The rapid-response energy storage system of claim 3, further comprising: an air regenerator, wherein the regulating valve communicates with an inlet of the expander unit through a low-temperature side of the air regenerator, and an outlet of the expander unit communicates with an inlet at a high-temperature side of the air regenerator and an inlet of the heating pipe in the compressor unit lubrication station, respectively.

5. The rapid-response energy storage system of claim 4, wherein a second valve is disposed at the inlet of the heating pipe in the compressor unit lubrication station.

6. The rapid-response energy storage system of claim 1, wherein an inlet at a low-temperature side of the compressor unit oil cooler communicates with an outside atmosphere, and an outlet at the low-temperature side of the compressor unit oil cooler communicates with an inlet of the compressor unit.

7. The rapid-response energy storage system of claim 1, wherein the regulating valve communicates with an inlet of the expander unit through a low-temperature side of the expander unit oil cooler.

8. The rapid-response energy storage system of claim 1, further comprising: a first heat exchanger, a second heat exchanger, a heat reservoir, a cold reservoir, a third valve and a fourth valve; wherein the cold reservoir, the third valve, a low-temperature side of the first heat exchanger, the heat reservoir, the fourth valve and a high-temperature side of the second heat exchanger are connected end to end to form a regenerative circulation loop; the outlet of the compressor unit communicates with the heating pipe in the expander unit lubrication station through a high-temperature side of the first heat exchanger, and the regulating valve communicates with an inlet of the expander unit through a low-temperature side of the second heat exchanger.

9. A method of using a rapid-response energy storage system, comprising operations at an energy storage stage:

S1.1, acquiring a first oil temperature of a compressor unit lubrication station, and proceeding to operation S1.2;

S1.2, judging whether the first oil temperature of the compressor unit lubrication station is not less than a first temperature threshold, if the first oil temperature of the compressor unit lubrication station is not less than the first temperature threshold, then proceeding to operation S1.3, and if the first oil temperature of the compressor unit lubrication station is less than the first temperature threshold, then proceeding to operation S1.1;

S1.3, starting an electric motor and a compressor unit oil pump, and proceeding to operation S1.4;

S1.4, acquiring a first oil temperature of an expander unit lubrication station, and proceeding to operation S1.5;

S1.5, judging whether the first oil temperature of the expander unit lubrication station is greater than a second temperature threshold, if the first oil temperature of the expander unit lubrication station is greater than the second temperature threshold, then proceeding to operation S1.6, and if the first oil temperature of the expander unit lubrication station is not greater than the second temperature threshold, then proceeding to operation S1.4; wherein the first temperature threshold is less than the second temperature threshold; and S1.6, closing a first valve;

the method further comprising operations at an energy release stage:

S2.1, acquiring a second oil temperature of the expander unit lubrication station, and proceeding to the operation S2.2;

S2.2, judging whether the second oil temperature of the expander unit lubrication station is not less than a third temperature threshold, if the second oil temperature of the expander unit lubrication station is not less than the third temperature threshold, then proceeding to operation S2.3, and if the second oil temperature of the expander unit lubrication station is less than the third temperature threshold, then proceeding to the operation S2.1;

S2.3, opening a regulating valve and starting an expander unit oil pump, and proceeding to operation S2.4;

S2.4, acquiring a second oil temperature of the compressor unit lubrication station, and proceeding to operation S2.5;

S2.5, judging whether the second oil temperature of the compressor unit lubrication station is greater than a fourth temperature threshold, if the second oil temperature of the compressor unit lubrication station is greater than the fourth temperature threshold, then proceeding to operation S2.6, and if the second oil temperature of the compressor unit lubrication station is not greater than the fourth temperature threshold, then proceeding to operation S2.4; wherein the third temperature threshold is less than the fourth temperature threshold; and S2.6, closing a second valve.

* * * * *